Patented Apr. 30, 1946

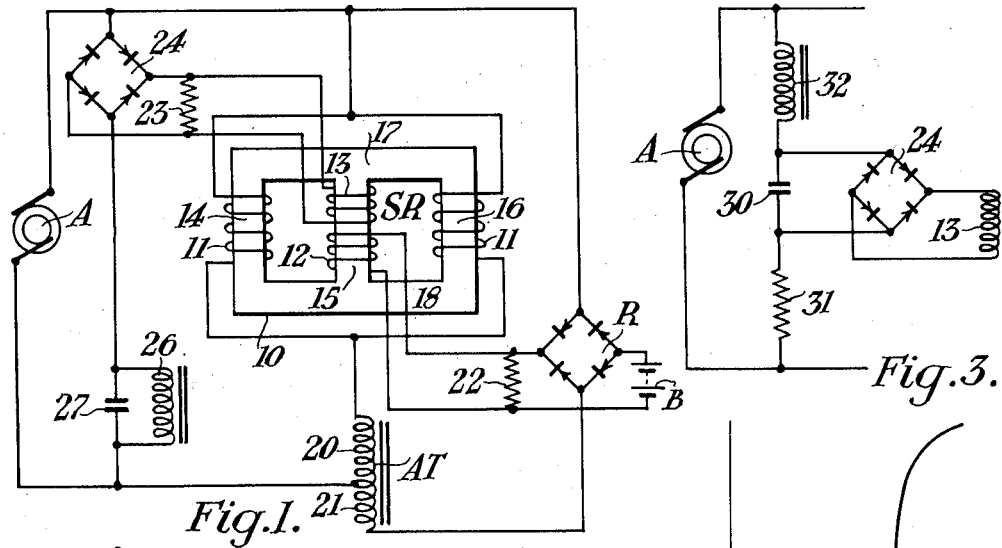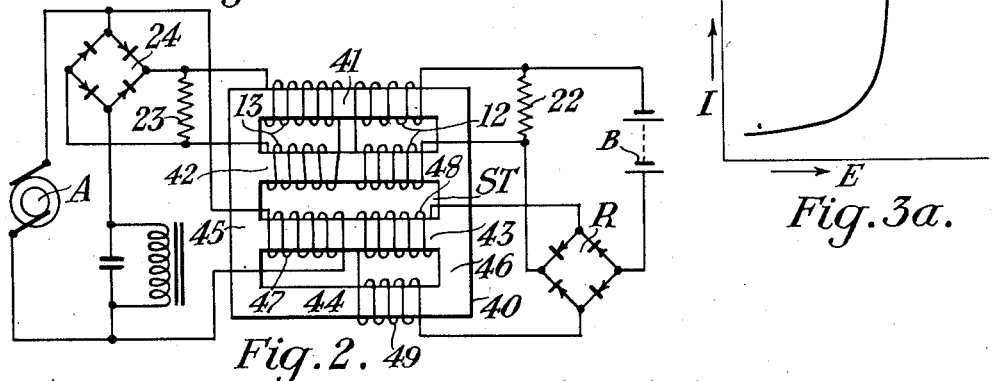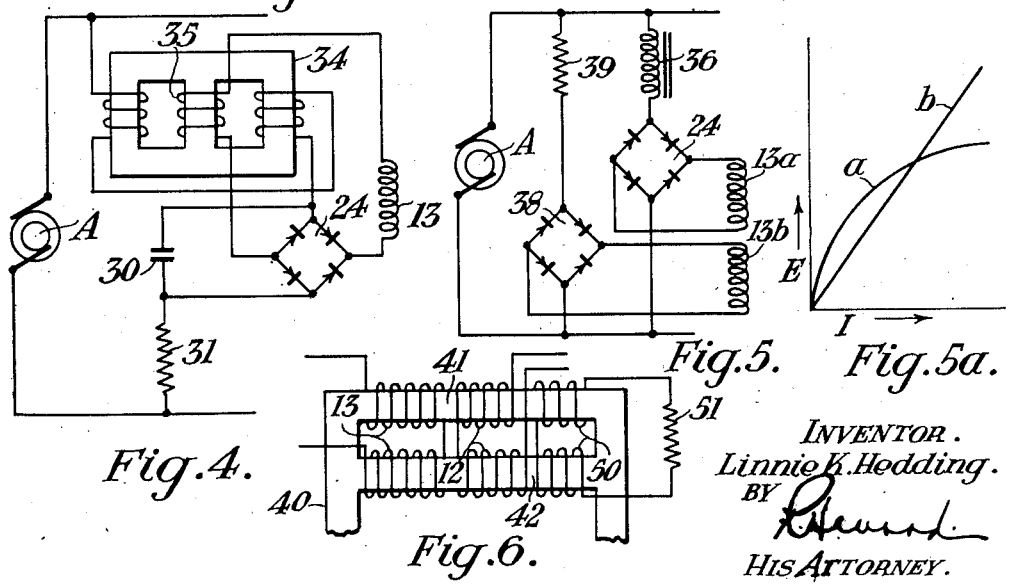

2,399,185

UNITED STATES PATENT OFFICE 2,399,185

REGULATING APPARATUS

Linnie K. Hedding, Wilkinsburg, Pa., assignor to The Union Switch & Signal Company, Swissvale, Pa., a corporation of Pennsylvania Application April 1, 1942, Serial No. 437,183

16 Claims. (Cl. 175—363)

My invention relates to regulating apparatus, and it has particular reference to apparatus for regulating the output voltage characteristics of a rectifier.

An object of my invention is the provision of novel and improved means for regulating the output voltage of a rectifier.

Another object of my invention is the provision of novel and improved means for compensating for the voltage drop in the rectifying elements employed in taper charging systems for storage batteries.

A further object is to provide novel and improved taper charging systems for storage batteries incorporating means for increasing the sensitivity of the system to small variations in the battery voltage.

Another object is to provide novel and improved taper charging systems for storage batteries incorporating means for causing the battery charging rates to be independent of variations in the applied alternating current voltage.

An additional object is to provide novel and improved battery charging systems incorporating means for compensating the charging rates for variations in the ambient temperature.

Another object is to provide novel and improved taper charging systems for storage batteries.

In practicing the invention, the above-mentioned and other important objects and characteristic features of my invention are attained by supplying a direct current load with energy from a rectifier connected across a main source of alternating current in series with an auxiliary source having a voltage made to vary in accordance with variations in load and ambient temperature and in the applied voltage of the main alternating current source. Control of the voltage of the auxiliary source is attained by means of a saturable magnetic device having a magnetizable core provided with windings carrying alternating current, the magnitude of which current is varied by means of direct current windings disposed on the core and connected one in series with the load and another across the main alternating current source in a voltage sensitive circuit. Additionally, means may be provided for compensating the apparatus for variations in the ambient temperature.

I shall describe several forms of apparatus embodying my invention, and shall then point out the novel features thereof in claims.

In the accompanying drawing, Fig. 1 is a diagrammatic view illustrating one form of apparatus embodying my invention applied to the control of the charging rate of a storage battery. Fig. 2 is a diagrammatic view illustrating a modification of the apparatus represented in Fig. 1, and also embodying my invention. Figs. 3, 4, 5 and 6 are each diagrammatic views representing modifications of portions of the apparatus represented in Figs. 1 and 2 and also embodying my invention. Figs. 3a and 5a are each graphical representations of voltage-current relationships in the apparatus represented in Figs. 3 and 5, respectively.

In each of the several views, similar reference characters have been employed to designate corresponding parts.

The invention may be utilized to control the output voltage of a rectifier supplying current to any suitable form of a direct current load, and is specifically represented as being applied to a rectifier supplying current to a storage battery. More particularly, my invention is represented applied to a battery, designated by the reference character B, which is arranged in a taper charging system to receive from a rectifier R a charging current which varies from a high to a low value as the charge progresses and the voltage of the battery rises. The battery B is connected in the output circuit of rectifier R, while the input terminals of the rectifier are connected to a suitable source of alternating current in series with an auxiliary source having a voltage made to vary in magnitude in accordance with load and applied voltage variations. The voltage of the auxiliary source is controlled by means of a saturable magnetic device having a core provided with a winding carrying alternating current, the magnitude of which current is varied by means of direct current windings disposed on the core and connected one in series with the battery in the rectifier output circuit and another in a voltage sensitive circuit across the main alternating current source. Connected in circuit with the direct current control windings may be means for compensating the apparatus for variations in the ambient temperature.

The saturable magnetic device may comprise either a saturable reactor SR as shown in Fig. 1, or a saturable transformer ST as shown in Fig. 2. The saturable reactor SR employed in Fig. 1 comprises a magnetizable core 10 provided with alternating current windings 11 and direct current control windings 12 and 13, the windings being arranged on the core so that flux due to current in the alternating current windings will not cause a resultant electromotive force to be induced in the direct current windings, whereas current in the direct current windings will create a flux effective to vary the impedance of the alternating current windings 11 and hence vary the voltage drop in such windings. Specifically, core 10 comprises three legs 14, 15 and 16 connected together by bridging members 17 and 18. The alternating current windings 11 are disposed one on either outer leg 14 and 16 of the core, and are connected, preferably in multiple as shown, or in series, in such manner that when energized the windings cooperate in circulating flux through a magnetic circuit comprising in series the two outer legs and the bridging members of the core. The multiple-connected windings 11 are proportioned to have an equal number of turns, hence the alternating current flux threading each of these windings will be equal and as a result substantially no alternating flux is caused to thread middle leg 15 of the core, on which leg are disposed the direct current control windings 12 and 13.

The alternating current windings 11 are connected across a suitable source of alternating current, such as an alternator, designated in the drawing by the reference character A, in series with the primary portion 20 of the winding of an auto-transformer AT mounted on the usual magnetizable core.

Rectifier R, hereinbefore mentioned, has its input terminals connected across alternator A in series with the secondary portion 21 of the winding of auto-transformer AT. Winding portion 21 may be wound either to aid or oppose the electromotive force derived from alternator A, but it is preferred that the direction of winding 21 be such that any electromotive force induced in the winding portion aids or adds to the voltage of alternator A. The output circuit of rectifier R comprises storage battery B connected in series with direct current control winding 12 of reactor SR, and preferably there is connected in series with battery B and in multiple with winding 12, a resistor 22 having preferably a zero or a negative temperature coefficient of resistance.

The other direct current control winding 13 is supplied with energy from a rectifier 24 which has its input terminals connected across alternator A in a voltage sensitive circuit preferably including a ferro-resonant circuit. The ferro-resonant circuit may be of the multiple type, as represented in Fig. 1, or of the series types represented in Figs. 3 and 4. Alternatively, the voltage sensitive circuit may be of the type represented in Fig. 5 for supplying energy to a network consisting of two control windings 13a and 13b. These various types of circuits will be discussed in detail hereinafter.

The apparatus represented in Fig. 1, employing a saturable reactor type of magnetizable control device and a parallel ferro-resonant voltage sensitive circuit connecting direct current control winding 13 across the alternator A, is adjusted so that the ferro-resonant circuit, comprising a reactor 26 connected in multiple with a capacitor 27, will be in optimum resonance at a voltage slightly above the normal average voltage of alternator A. This circuit is, therefore, slightly out of resonance when the voltage of the alternator is at its normal value. Winding 13 energized by current from rectifier 24 is arranged on leg 15 of core 10 to create flux which aids the flux due to current in the other control winding 12 connected in series with battery B.

The two windings 12 and 13 are proportioned so that, with a constant applied voltage derived from alternator A, the direct current magnetic flux in core 10 is caused to vary in accordance with the charging rate of battery B so as to obtain a decrease in the voltage drop across the reactor windings 11 with an increase in the charging rate, thereby to compensate for the increased drop in the rectifier R as the charging rate increases. That is to say, the windings 12 and 13 are proportioned so that for any charging rate within the limits of the apparatus, the direct current magnetization of the core is such as to cause the voltage drop in winding 11 of the reactor to reach a value such that the portion of the alternating voltage appearing across the primary portion 20 of transformer AT causes an additional voltage induced in the secondary portion 21 of the winding to be added into the alternator voltage and impressed across rectifier R. The resultant voltage at the input terminals of the rectifier causes the current supplied to battery B to reach the value desired under the particular terminal voltage and ambient temperature conditions, and this current, traversing winding 12, creates a flux which together with the flux due to the current in winding 13 establishes the desired impedance conditions in the impedance windings 11 of the reactor to support this condition.

If the terminal voltage of battery B drops, due to an applied load or to a discharged condition of the battery, then the charging rate of the battery should be increased automatically and this result is accomplished by the apparatus since a higher value of current will be caused to flow through the battery and winding 12, thus increasing the unidirectional magnetic flux in core 10 to lower the impedance of windings 11. This results in a lower voltage drop across these windings with an increased voltage drop appearing in primary portion 20 of transformer AT, whereupon the induced electromotive force of the secondary portion 21 is caused to increase in value to compensate for the increased voltage drop in the rectifier under the increased load conditions. By suitably proportioning the parts of reactor SR and transformer AT, the reactance of windings 11 may be made to vary automatically in accordance with variations in the charging rate so as to obtain an increased voltage applied to rectifier R with an increase in the magnitude of the charging current. If desired, other proportions may be employed, as for example, the parts may be selected to cause the input voltage of rectifier R to remain constant, or to decrease in a predetermined manner with a change in the load or charging current.

For a given terminal voltage of battery B, variations in the voltage derived from the main source of alternating current, alternator A, would normally cause a variation in the voltage applied to rectifier R and hence result in a variation in the charging rate of the battery. To compensate for such variations in the line voltage, the direct current control winding 13 is employed and is connected in a voltage sensitive circuit across alternator A. The circuit connection when incorporating the parallel ferro-resonant circuit of Fig. 1 is adjusted for optimum resonance at a voltage slightly above the normal average voltage of alternator A, hence should an increase occur in the voltage of alternator A, the voltage sensitive circuit more nearly approaches resonance with a resultant marked decrease in current in winding 13, accompanied by a decrease in the unidirectional flux in core 10 and resulting in causing the impedance of windings 11 to increase to a value such that the induced electromotive force of winding 21 decreases sufficiently to cause the voltage applied to rectifier R to remain constant. Conversely, a drop in the line voltage of alternator A results in an increase in the direct current magnetization of core 10, and causes an increased electromotive force to be induced in winding 21 to compensate for the decreased main voltage available.

The voltage sensitive circuit incorporating the parallel ferro-resonant circuit represented in Fig. 1 may be replaced by a series ferro-resonant circuit as represented in Fig. 3. In such case, capacitor 30 and resistor 31 of Fig. 3 have a linear volt-ampere characteristic, while reactor 32 is designed to cooperate therewith to provide a typical volt-ampere curve as represented in Fig. 3a. This circuit arrangement is very sensitive to small changes in applied voltage, and obviously is arranged so that an increase in voltage results in an increase in current in the circuit, hence winding 13 energized therefrom must be arranged on the magnetizable core so as to create flux which opposes the flux due to current in the other direct current winding 12. Rectifier 24 may be connected in such circuit in any suitable manner such that the output current of the rectifier varies in the same manner as the current in the resonant circuit. A preferred arrangement, as shown in Fig. 3, comprises connecting rectifier 24 in multiple with capacitor 30.

The sensitivity of the ferro-resonant circuit represented in Fig. 3 may be increased as shown in Fig. 4 by employing a saturable reactor 34 in the place of reactor 32 employed in Fig. 3. The current from rectifier 24 is then passed through control winding 35 of this reactor in series with winding 13, thus giving a regenerative effect to the series resonant circuit.

Alternatively, the capacitor 27 may be eliminated from the circuit represented in Fig. 1 by substituting the circuit arrangement represented in Fig. 5. In this latter arrangement, a winding 13a is energized from a rectifier 24 which has a reactor 36 connected in its input circuit. The reactor is worked near its saturation value so that a small change in the applied alternating current voltage is accompanied by a large change in current through the reactor winding, as represented in curve a of Fig. 5a. Current in the winding 13a is arranged to create a flux which opposes the flux due to current in the other direct current control winding 12; and another direct current control winding 13b, energized from a rectifier 38 having a resistor 39 connected in its input circuit and therefore having a voltage-current relation as shown in curve b of Fig. 5a, is employed as a biasing winding for creating flux which substantially neutralizes the flux due to the current required to raise reactor 36 to its saturation value.

The apparatus of Fig. 1 incorporates means, hereinbefore referred to, for compensating for variations in the output voltages of both battery B and rectifier R caused by variations in the ambient temperature. That is to say, the terminal voltage of a storage battery increases as the temperature drops and decreases as the temperature rises. The terminal voltage of rectifier R is, therefore, adjusted to vary in accordance with variations in ambient temperature, by connecting a resistor 23, having preferably either a zero or a negative temperature coefficient of resistance, in the output circuit of rectifier 24 in shunt with winding 13. The winding, constructed of copper wire as is the usual practice, has a positive temperature coefficient of resistance, hence as the temperature increases, the resistance of the winding likewise increases. Shunt resistor 23 either maintains a constant resistance or decreases in resistance as the temperature increases, and under such conditions there is a larger portion of the current from rectifier 24 shunted by resistor 23 away from winding 13, accompanied by a decrease in the magnetization of device SR and a larger voltage drop across windings 11. The input voltage to rectifier R is thus decreased to lower the rectifier output voltage and thus compensate for the drop in battery voltage caused by a rise in the ambient temperature.

If the series resonant circuits of Fig. 3 or 4 or the voltage sensitive circuit of Fig. 5 is employed in place of the multiple resonant circuit of Figs. 1 and 2, the temperature compensating resistor 23 should have a positive temperature coefficient greater than that of copper. In the case of Figs. 3 and 4 the desired result is obtained in part by connecting the input terminals of rectifier 24 across resistor 31 instead of across condenser 30 and then selecting resistor 31 to have a positive temperature coefficient of resistance. The desired result can also be secured by inserting resistance having negative temperature coefficient of resistance in series with winding 13 so as to over-compensate for the increase in resistance of the winding 13 with increasing temperature.

When rectifier R is constructed of copper-oxide or other dry-disc rectifying elements having a negative temperature coefficient of resistance, its output terminal voltage drops with a decrease in ambient temperature, due to the increased drop in the rectifier. Compensation for this characteristic is attained by connecting resistor 22, having either a zero or a negative temperature coefficient of resistance, in the output circuit of rectifier R in series with battery B and in shunt with winding 12. The winding, constructed of copper wire, has a positive temperature coefficient of resistance and hence its resistance decreases as the ambient temperature drops. The shunt resistor 22 either remains at a constant resistance, or increases in resistance, when the temperature drops and under such conditions a smaller portion of the rectifier current is shunted by resistor 22 away from winding 12. The magnetization of device SR accordingly is increased to decrease the voltage drop across windings 11 and increase the input voltage to the rectifier, thus compensating for the increased voltage drop in the rectifier caused by a decrease in ambient temperature.

The saturable transformer ST employed in the alternative embodiment of the invention represented in Fig. 2 comprises a magnetizable core 40 having four legs 41, 42, 43 and 44 connected together by bridging members 45 and 46. A primary winding 47, connected across alternator A, is disposed on an inner leg 43 of the core and has associated therewith in inductive relationship a secondary winding 48 also disposed on leg 43. The flux due to current in winding 47 of course links winding 48 to induce therein an electromotive force having a value proportional to the voltage of alternator A. An auxiliary winding 49 is disposed on the adjacent core leg 44, and the windings 48 and 49 are connected in series to the input terminals of rectifier R, with the windings arranged preferably in additive relation so that any electromotive force induced in winding 49 is added to the electromotive force induced in winding 48.

The alternating current flux due to current in winding 47 is provided with two magnetic circuits arranged in parallel relation. One circuit, which I shall term the main magnetic circuit, includes leg 44 on which auxiliary winding 48 is disposed, and the other or leakage magnetic circuit includes legs 41 and 42 connected in multiple. The portion of the alternating current flux threading the main magnetic circuit is controlled by means of direct current control windings 12 and 13 disposed on the leakage path and connected, as described in detail in connection with the apparatus of Fig. 1, that is, one winding 12 in the output circuit of rectifier R in series with battery B and the other winding 13 in the output circuit of rectifier 24. Each of the two control windings comprises two coils one on each of the two legs 41 and 42 and connected in series in such manner that when energized the two coils cooperate in circulating a flux through the two legs 41 and 42 in series.

The apparatus of Fig. 2 is adjusted so that for any charging rate within the limits of the apparatus, the direct current magnetization of the core causes the inductive coupling of winding 49 with winding 47 to result in the induction in winding 49 of an electromotive force having a value such that when added to the electromotive force of winding 48, the resultant voltage impressed on rectifier R causes the rectifier to supply the battery with current having the value desired under the particular terminal voltage and ambient temperature conditions. This current, flowing in winding 12, creates a flux which together with the flux due to current in winding 13 establishes the desired condition of inductive coupling of windings 47 and 49.

If the terminal voltage of battery B drops, more current is supplied to battery B and the output voltage of rectifier R tends to drop due to the increased voltage drop in the rectifier and the drop in induced voltage in winding 49. This higher current flow in winding 12, however, increases the magnetization of the leakage path of the core and forces a greater portion of the alternating current flux through leg 44, thus resulting in an increase rather than a decrease in electromotive force induced in winding 49. The parts are preferably so proportioned that the increase in the electromotive force induced in winding 49 compensates for the increased voltage drop in the rectifier, thereby rendering the apparatus capable of charging the battery at the higher rate and with a constant voltage appearing at the battery.

The other control winding 13 functions to compensate for applied voltage variations in a manner substantially corresponding to that pointed out in detail hereinbefore in connection with the apparatus of Fig. 1. That is to say, should the voltage of source A increase, the voltage sensitive circuit more nearly approaches resonance and the current therein decreases to lower the magnetization of the leakage circuit of the magnetizable core. More flux from winding 47 is thus diverted from winding 49 to decrease the electromotive force induced therein, whereby the resultant electromotive force applied to rectifier R is made to remain substantially constant regardless of variations in the voltage of the main source.

The apparatus of Fig. 2 incorporates resistors 21 and 22 connected in circuit with control windings 12 and 13, respectively, for attaining compensation for ambient temperature variations, as will readily be apparent from an inspection of the drawing taken in connection with the foregoing description of the apparatus of Fig. 1.

The apparatus of Fig. 2 may be modified by replacing the voltage sensitive circuit represented in Fig. 2 by any of the hereinbefore described alternative voltage sensitive circuits as shown in Fig. 3, 4 or 5. Additionally, the apparatus represented in Fig. 2 may be modified as shown in Fig. 6 to incorporate a ripple suppressing winding 50 on the leakage magnetic circuit of the transformer core 40. As shown in Fig. 6, winding 50 comprises a pair of coils wound exactly alike, one disposed on leg 41 and the other disposed on leg 42 of the leakage path and connected together so that any difference in voltage induced therein as a result of uneven distribution of alternating current flux in the two legs of the leakage path causes current to flow in the winding. This tends to prevent uneven distribution of alternating current flux in the parallel legs of the leakage path so that there is very little alternating current voltage induced in the direct current control windings 12 and 13. Ripple winding 50 also has the effect equivalent to increasing the reluctance of the legs 41 and 42 of the leakage magnetic circuit of core 40. This effect and, hence, the output of the saturable transformer may be caused to vary in a predetermined manner with changes in ambient temperature by inserting a resistor 51 having a suitable temperature coefficient in series with the ripple winding 50 as indicated in Fig. 6.

From the foregoing, it is readily apparent that I have provided means whereby a storage battery may be arranged to receive from a rectifier a charging current which tapers from a high to a low value automatically as the charge progresses and the voltage of the battery rises. This control of the charge rate is attained by connecting the battery B in the output circuit of a rectifier while connecting the input terminals of the rectifier to a suitable source of alternating current connected in series with an auxiliary source having a voltage made to vary in magnitude in accordance with load and applied voltage variations. The voltage of the auxiliary source is controlled by means of a saturable magnetic device having a core provided with a winding carrying alternating current, the magnitude of which current is varied by means of direct current windings disposed on the core and connected one in series with the battery in the rectifier output circuit and another in a voltage sensitive circuit across the main alternating current source.

Although I have herein shown and described only a few forms of regulating apparatus embodying my invention, it is understood that various changes and modifications may be made therein within the scope of the appended claims without departing from the spirit and scope of my invention.

Having thus described my invention, what I claim is:

1. In combination, a source of alternating current, a rectifier, a direct current load connected in the output circuit of said rectifier, a magnetizable core, a circuit connected across said source and including an alternating current winding disposed on said core, a voltage sensitive ferroresonant circuit connected across said source in multiple with said alternating current winding, another rectifier energized from said voltage sensitive circuit and having an output circuit including a direct current control winding disposed on said magnetizable core, another direct current control winding disposed on said magnetizable core and connected in series with said load in the output circuit of said first rectifier, and an input circuit for said first rectifier inductively coupled with said circuit including said alternating current winding.

2. In combination, a source of alternating current, a rectifier, a direct current load connected in the output circuit of said rectifier, a magnetizable core, a circuit connected across said source and including an alternating current winding disposed on said core, a voltage sensitive ferro-resonant circuit connected across said source in multiple with said alternating current winding, another rectifier energized from said voltage sensitive circuit and having an output circuit including a direct current control winding disposed on said magnetizable core, an input circuit for said first rectifier inductively coupled with said circuit including said alternating current winding.

3. In combination, a source of alternating current, a rectifier, a direct current load connected in the output circuit of said rectifier, a magnetizable core, a circuit connected across said source and including an alternating current winding disposed on said magnetizable core, a voltage sensitive ferro-resonant circuit comprising a reactor and a capacitor connected in multiple across said source and adjusted for optimum resonance at a voltage slightly higher than the normal voltage of said source, another rectifier energized from said voltage sensitive circuit and having an output circuit comprising a direct current control winding disposed on said magnetizable core, another direct current control winding disposed on said magnetizable core and connected in series with said load in the output circuit of said first rectifier, and an input circuit for said first rectifier inductively coupled to said first circuit.

4. In combination, a source of alternating current, a rectifier, a direct current load connected in the output circuit of said rectifier, a magnetizable core, a circuit connected across said source and including an alternating current winding disposed on said magnetizable core, a voltage sensitive ferro-resonant circuit comprising a reactor and a capacitor connected in multiple across said source and adjusted for optimum resonance at a voltage slightly higher than the normal voltage of said source, another rectifier energized from said voltage sensitive circuit and having an output circuit comprising a direct current control winding disposed on said magnetizable core, and an input circuit for said first rectifier coupled to said first circuit.

5. In combination, a source of alternating current, a rectifier, an output circuit for said rectifier including a direct current load, a magnetizable core, a voltage sensitive ferro-resonant circuit comprising an inductance and a capacitor connected in series across said source and adjusted for optimum resonance at a voltage slightly above the average of said source, another rectifier energized from said voltage sensitive circuit and having an output circuit comprising a direct current control winding disposed on said magnetizable core, another circuit connected across said source in multiple with said voltage sensitive circuit and including an alternating current winding disposed on said magnetizable core, another direct current control winding disposed on said magnetizable core and connected in series with said load in the output circuit of said first rectifier, and an input circuit for said first rectifier coupled to said circuit including said alternating current winding.

6. In combination, a source of alternating current, a rectifier, a direct current load connected in the output circuit of said rectifier, a magnetizable core, a circuit connected across said source and including an alternating current winding disposed on said magnetizable core, a voltage sensitive ferro-resonant circuit comprising an inductance mounted on an iron core and a capacitor connected in series with said inductance across said source and adjusted for optimum resonance at a voltage slightly higher than the normal voltage of said source, another rectifier energized from said voltage sensitive circuit and having an output circuit comprising a direct current control winding disposed on said magnetizable core and connected in series with another control winding disposed on said iron core, another direct current control winding disposed on said magnetizable core and connected in series with said load in the output circuit of said first rectifier, and an input circuit for said first rectifier coupled to said first circuit.

7. In combination, a source of alternating current, a rectifier, an output circuit for said rectifier including a direct current load, a magnetizable core, a voltage sensitive ferro-resonant circuit comprising a saturable reactor having an iron core provided with an impedance winding that is connected in series with a capacitor across said source, said circuit being adjusted for optimum resonance at a voltage slightly above the voltage of said source, another rectifier energized from said voltage sensitive circuit and having an output circuit comprising a direct current control winding disposed on said magnetizable core, another circuit connected across said source in multiple with said voltage sensitive circuit and including an alternating current winding disposed on said magnetizable core, another direct current control winding disposed on said magnetizable core and connected in series with said load in the output circuit of said first rectifier, an input circuit for said first rectifier coupled to said circuit including said alternating current winding.

8. In combination with a source of alternating current and a rectifier and a direct current load connected in the output circuit of said rectifier, a magnetizable core, a voltage sensitive circuit connected across said source and comprising two paths connected in multiple, a resistor interposed in one of said paths and an iron core inductance interposed in the other of said paths, said inductance normally being energized substantially at its saturation value, two other rectifiers energized respectively from said two multiple paths, output circuits for said other rectifiers each including a direct current control winding disposed on said magnetizable core, another circuit connected across said source in multiple with said voltage sensitive circuit and including an alternating current winding disposed on said magnetizable core, another direct current control winding disposed on said magnetizable core and connected in series with said load in the output circuit of said first rectifier, and an input circuit for said rectifier coupled to said first circuit including said alternating current winding.

9. In combination, a direct current load, a source of alternating current, a saturable reactor having impedance and control windings disposed on a magnetizable core, an auto-transformer having its primary winding portion connected across said source in series with said reactor impedance windings, a rectifier connected across said source in series with the secondary winding portion of said auto-transformer, an output circuit for said rectifier including said load in series with one of said reactor control windings, another rectifier having its output circuit connected to another of said reactor control windings, and an input circuit for said other rectifier connected directly across said source and including a parallel ferro-resonant circuit adjusted to optimum resonance at a voltage slightly above the normal average voltage of said source.

10. In combination, a direct current load, a source of alternating current, a transformer comprising a magnetizable core provided with two magnetic circuits having a portion in common, a primary winding disposed on said common portion of said core and connected across said source, a secondary winding disposed on said common core portion, an auxiliary winding disposed on one of said two magnetic circuits, a rectifier, an input circuit for said rectifier including said secondary winding and said auxiliary winding connected in series, an output circuit for said rectifier including in series said load and a control winding disposed on said other magnetic circuit, another rectifier connected across said source in an input circuit including a parallel ferro-resonant circuit adjusted to optimum resonance at a voltage slightly above the average voltage of said source, and an output circuit for said other rectifier including another control winding disposed on said other magnetic circuit.

11. In combination, a source of alternating current, a transformer comprising a magnetizable core provided with a main and a leakage magnetic circuit, both said circuits having a portion of said core in common, a primary winding connected to said source and disposed on said common core portion, a secondary winding disposed on the portion of said core included in said main magnetic circuit, a rectifier, a circuit connecting said secondary winding to the input terminals of said rectifier, a load, a magnetizing winding disposed on the portion of said core included in said leakage magnetic circuit of said core, a circuit connecting said load and said magnetizing winding in series with the output terminals of said rectifier, and another winding disposed on said portion of the core included in said leakage magnetic circuit and closed on itself through a resistor having a predetermined temperature coefficient of resistance selected with respect to the resistance coefficient of said other winding to vary the effect of such other winding on flux in said core in accordance with ambient temperature.

12. In combination, a source of alternating current, a transformer comprising a magnetizable core provided with two magnetic circuits having a portion in common, a primary winding disposed on said common portion of said core and connected across said source, a secondary winding disposed on the portion of said core included in one of said two magnetic circuits, a rectifier, an input circuit for said rectifier including said secondary winding, a load, an output circuit for said rectifier including said load and a control winding disposed on the portion of the core included in the other of said two magnetic circuits, another control winding on said portion of the core included in said other magnetic circuit and closed on itself through a resistor having a temperature coefficient of resistance selected with respect to that of said other control winding to effect a varying control of flux in said magnetizable core by said other control winding in response to variations in ambient temperature.

13. In combination, a source of alternating current, a first rectifier, a load, a saturable magnetic device provided with direct current control windings, an output circuit for said first rectifier including said load connected in series with one of said direct current control windings, a second rectifier, an output circuit for said second rectifier including another of said direct current control windings, an input circuit for said second rectifier including a ferro-resonant circuit connected across said source and adjusted for optimum resonance at a voltage slightly above the normal voltage of said source, another circuit including an alternating current winding on said saturable magnetic device connected across said source in multiple with the input circuit of said second rectifier and an input circuit for said first rectifier coupled with said circuit including said alternating winding.

14. A combination according to claim 13, further characterized by the provision of means comprising a resistor connected in said rectifier output circuit in series with said load and in multiple with said other control winding, said resistor having a predetermined temperature coefficient of resistance for automatically compensating the apparatus for variations in ambient temperature.

15. A combination according to claim 13, further including a resistor having a temperature coefficient of resistance different from that of copper connected in the output circuit of said first rectifier in multiple with said one control winding, and including another resistor having a temperature coefficient of resistance different from that of copper connected in the output circuit of said other rectifier in multiple with said other control winding.

16. In combination with a source of alternating current, a saturable reactor having impedance and control windings disposed on a magnetizable core, an auto-transformer having its primary winding portion connected across said source in series with said reactor impedance windings, a rectifier, an input circuit for connecting the input terminals of said rectifier across said source in series with the secondary winding portion of said auto-transformer, a direct current load, an output circuit for connecting said load in series with one of said reactor control windings across the output terminals of said rectifier, another rectifier having its output circuit connected to another of said reactor control windings, and an input circuit for said other rectifier connected directly across said source and including a parallel ferro-resonant circuit adjusted to optimum resonance at a voltage slightly above the normal average voltage of said source.

LINNIE K. HEDDING.